Jan. 23, 1968  D. T. DANIELE  3,364,756
CAM DRIVEN FOLLOWER ASSEMBLY
Filed March 10, 1966  3 Sheets-Sheet 2
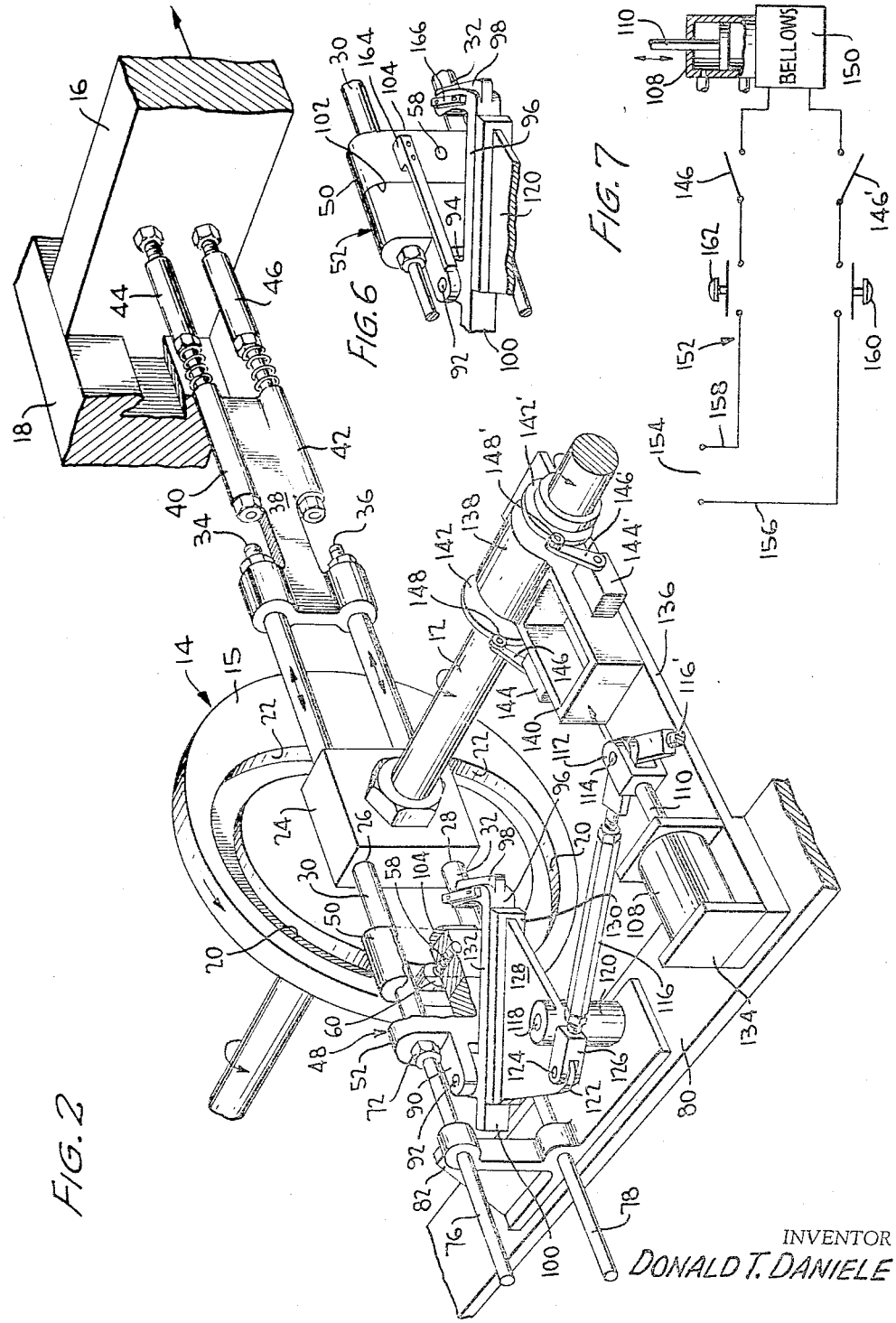
INVENTOR,
DONALD T. DANIELE
BY Karl W. Flocks
ATTORNEY

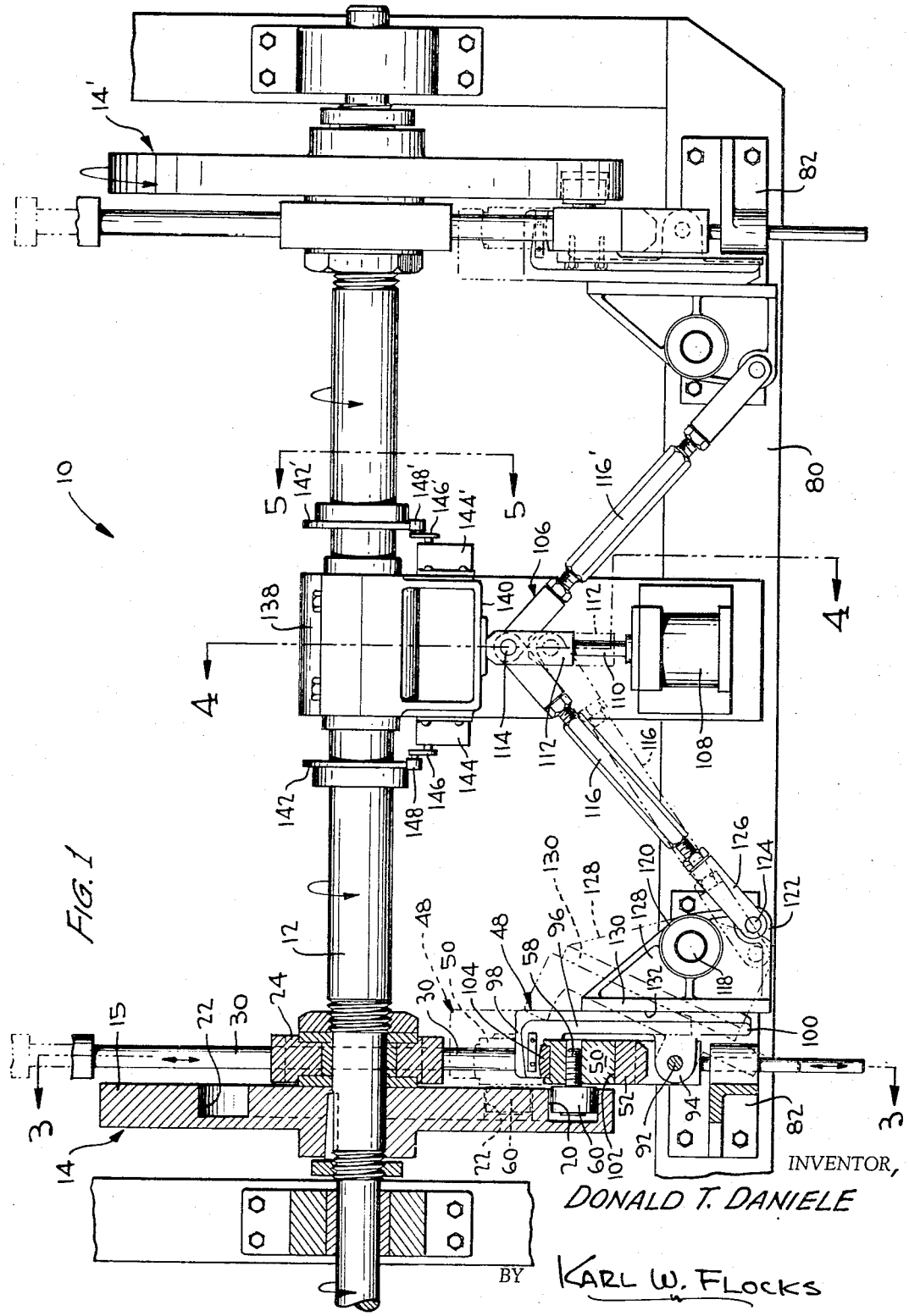

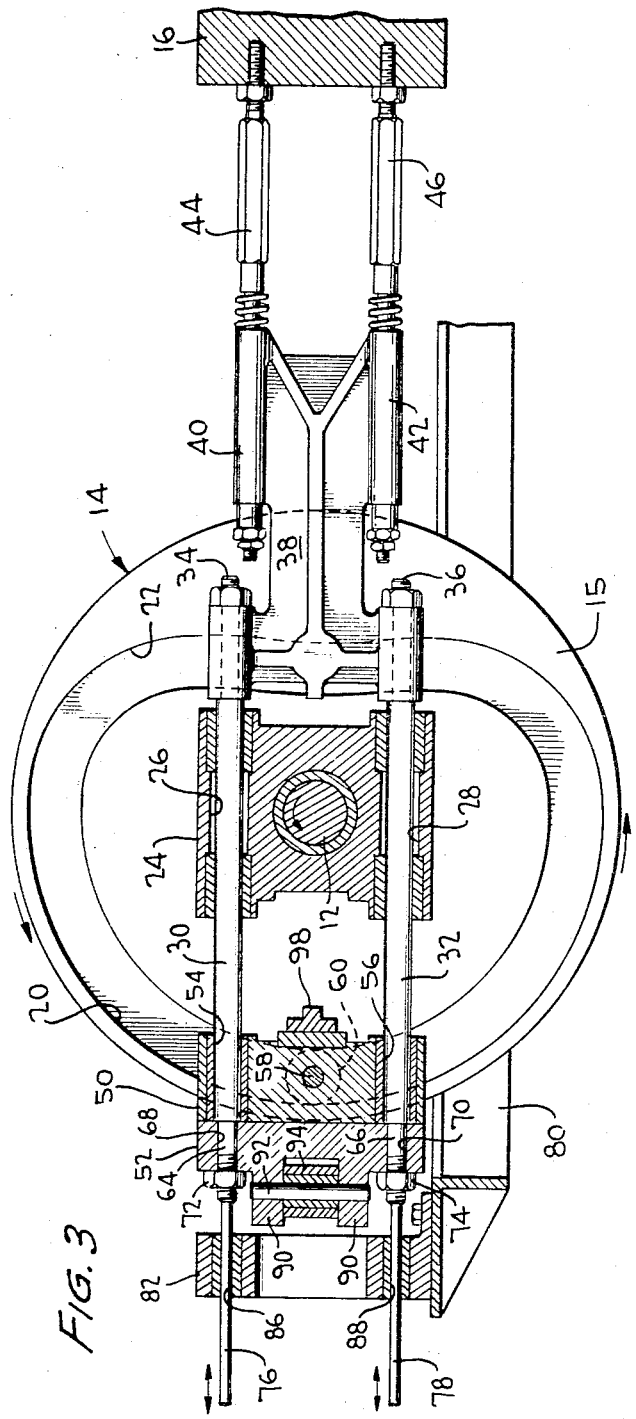

United States Patent Office 3,364,756
Patented Jan. 23, 1968

3,364,756
CAM DRIVEN FOLLOWER ASSEMBLY
Donald T. Daniele, East Longmeadow, Mass., assignor to Diamond International Corporation, New York, N.Y., a corporation of Delaware
Filed Mar. 10, 1966, Ser. No. 533,371
7 Claims. (Cl. 74—55)

This invention relates generally to cam driven mechanisms and particularly to improvements in a coupling and uncoupling assembly of a cam drive and the mechanism operated thereby.

The present invention is of the general character which may be utilized in the apparatus disclosed and described in detail in U.S. Letters Patent to Daniele et al. No. 3,166,468 issued Jan. 19, 1965.

A primary object of the present invention is to provide in a cam drive assembly, which is to be directly coupled to a driven mechanism, means for coupling and decoupling the cam drive so that the driving and driven mechanism can always be connected in "timed" relationship required for the proper operation of the apparatus.

Another object of the present invention is to provide, in conjunction with a continuously driven cam and mechanism to be directly coupled or driven thereby, a novel follower means which incorporates means for "locking" or "coupling" the cam and driven mechanism in a simple and expeditious manner without interrupting the timed relation of the cam and/or driven mechanism.

Particular advantages of this invention are that the cam always is oriented in a positive fixed driving relationship with respect to the mechanism to be driven and thus permits positive or rigid drive means to be utilized between the cooperating parts.

The invention provides a cam follower system with a coupling mechanism which can only be operated during a "dwell" period of the cam drive and for this purpose includes means for automatically coupling or decoupling the cam and mechanism to be driven while the cam is being continuously rotated.

The invention further provides a safety means which allows the cam motion to be interrupted during a malfunction or jam of the mechanism being driven, and which is particularly adapted for use in pulp molding apparatus, for example, for the purpose of eliminating the possibility of "empty" molding dies being engaged, and which subsequently permits cooperating molding dies to perform their normal function after molded pulp has been deposited on the "wire screen."

These, together with other objects and advantages, will become apparent from a consideration of the following description when taken in conjunction with the drawings forming a part thereof, in which:

FIG. 1 is a top plan view of a pair of similar cam drives, showing in solid lines the following or coupling mechanism in a coupled position, portions being broken away and shown in section in order to show details, and illustrating by phantom lines the range of movement of the follower mechanism;

FIG. 2 is a fragmentary, perspective view of one of the cam drives of FIG. 1 showing the follower mechanism in an uncoupled position, parts being broken away and shown in section for purposes of clarity;

FIG. 3 is a sectional view taken substantially on the plane of line 3—3 of FIG. 1;

FIG. 4 is a sectional view taken substantially on the plane of line 4—4 of FIG. 1, showing details of the operating means for the coupling mechanism of the cam drive;

FIG. 5 is a sectional view taken substantially on the plane of line 5—5 of FIG. 1 showing details of a circuit-control, timing cam insuring coordinated or timed coupling of the cam follower with the driving cam during the "dwell" period of the cam;

FIG. 6 is a fragmentary perspective view showing details of a mechanical safety-stop utilized on the follower mechanism to prevent improper coupling of the driving cam and the cam follower; and FIG. 7 is a circuit diagram showing a typical safety system utilized for assuring coupling of the cam follower with the cam only during the dwell period of the cam.

Before describing the exemplary embodiment of the invention in detail, those skilled in the art will readily appreciate the invention as particularly adapted for use in pulp molding apparatus. However, it will also be appreciated by those skilled in the art that the invention is equally adapted for use in any arrangement where a mechanism is positively driven by a cam.

Additionally, although a pair of cam drives are illustrated in the exemplary embodiment, the invention, i.e. novel cam follower assembly, etc., is equally applicable for use in a single cam drive installation.

Referring to the drawing in detail, and considering FIGS. 1 and 2, for example, a drive assembly for use on a molded pulp article pressing apparatus, or a molding apparatus, for example, is indicated generally at 10. The drive assembly comprises a suitably journaled power shaft means 12 upon which is fixedly mounted, in any suitable manner, at least one primary drive cam, two of such cams being indicated generally at 14 and 14'. The pair of cam means 14 and 14', used in the exemplary embodiment, will equalize the force applied at opposite ends of a relatively massive slide member 16 suitably supported at opposite ends for reciprocal movement in guide tracks such as that indicated at 18 (only one end of the slide being shown)—see FIG. 2.

The shaft means 12 and cam means 14 fixedly mounted thereon will be constantly rotated when the apparatus is being operated under normal conditions. The cam means 14 has suitably milled on the inner surface 15 thereof continuous communicating portions comprising a dwell portion 20, concentric to the axis of rotation of the shaft means 12, the dwell portion 20 merging at opposite ends into an operating portion 22, extending inwardly toward the shaft, for reciprocating the slide 16 in a manner to subsequently be described in detail. The shaft 12 has fixed thereon in any suitable manner a bearing block means 24 having formed therein parallel bore portions 26 and 28 having bearing sleeves therein (see FIG. 3 for example). Reciprocably supported in the sleeves 26 and 28 are force transmitting means such as rods 30 and 32, respectively, which have fixed to ends 34 and 36 (conveniently described as the forward end) in any suitable manner, an adapter plate 38 incorporating a pair of parallel sleeves 40 and 42. Fixed in the sleeves 40 and 42 are coupler rods 44 and 46, respectively, suitably connected to the slide 16.

Indicated generally at 48 is a combined cam follower means or follower means which includes a follower block element 50 and coupler or latch block element 52.

The follower block 50 incorporates mutually parallel bore portions 54 and 56, in linear alignment with bore portions 26 and 28, respectively, and reciprocably received on the rods 30 and 32 (see FIG. 3). Fixed to a central portion of the block 50 is a support shaft 58 (see FIG. 2) upon which is journaled a roller element 60 received within the cam groove and following the path of continuous, communicating groove portions 20 and 22.

As the cam 14 is continuously rotated, the block 50 will move in a rectilinear path on the rods 30 and 32 according to the configuration of the operating portion 22 of the cam groove of the cam.

As seen in FIG. 3, the rods 30 and 32 respectively include rear, reduced diameter portions 64 and 66 receiving thereon conforming, mutually parallel bore portions 68 and 70 of the coupling or latch block element 52. The reduced diameter portion 64 and 66 are peripherally threaded and received thereon clamp nuts 72 and 74 securing the block 52 in fixed relationship with respect to the rods 30 and 32. Projecting rearwardly from the nuts 72 and 74 are reduced diameter tail or guide portions 76 and 78 of the rods 30 and 32, respectively. The apparatus includes a suitable support or bed portion 80 upon which is mounted a vertically extending bracket 82 having formed therein bearing sleeve portions 86 and 88 reciprocably receiving the tail portions 76 and 78 of the respective rods.

The coupling or latch block element 52 incorporates support portions comprising overlying rearwardly extending ears 90 receiving therethrough in suitable overlying apertures a vertical support shaft 92. Hingedly mounted on the shaft 92 is a vertically extending sleeve 94 integral with the right angularly disposed, vertically extending plate 96 terminating at its forward end in a generally right angularly directed abutment or fork portion 98. The plate 96 includes a rear portion 100 extending beyond the pivot pin or shaft 92 and accordingly provides a lever arm for the coupler block element 52, about the pivot-axis defined by shaft 92. As seen, for example, in FIG. 1, the follower block 50 will engage the coupling block 52 at edge 102 thereof, and the forward portion 104 of the follower block will be engaged by portion 98 of the coupling block 52, when the coupler block is in the position shown in FIG. 1.

As previously mentioned, rotation of the cam 14 and the groove portions 20 and 22 thereof cause corresponding movements of the follower block 50. Since the coupler block 52 is fixedly secured to the rods 30 and 32, when the coupler block 52 is in the position shown in FIG. 1, movement of the follower block element causes corresponding movement of the coupler block 52 and rods attached thereto in the manner indicated by the direction arrows in FIG. 1.

Indicated generally at 106 is motor means for engaging and disengaging the coupler block element 52 with the follower block element 50. As previously mentioned, although a pair of cams 14 and 14', together with the described follower block element, coupling blocks elements, etc., have been disclosed in FIG. 1, a single cam drive installation apparently falls within the scope of the present invention. Accordingly, only one-half of the structure shown in FIG. 1 has been described in detail, since those skilled in the art will readily appreciate that the structure shown at the right hand portion of FIG. 1, for example, is a mirror image of that shown in the left hand portion thereof.

The operating means 106 comprises suitable motor means 108 comprising a pneumatic piston and cylinder combination, for example, mounted on the machine bed portion 80 having projecting forwardly therefrom a force transmitting rod 110 terminating in a bifurcated coupling portion 112. Pivotally connected to the bifurcated coupling portion 112 on a pivot pin 114 are apertured end portions of force transmitting rods 116 and 116'. Pivotally mounted on a vertical pivot axis 118 is the sleeve portion 120 of an abutment shoe incorporating a lever portion 122 pivotally connected at 124 to the bifurcated end 126 of the force transmitting rod 116. Integral with the sleeve 120 and projecting laterally therefrom is a web 128 to which is secured an abutment shoe or plate 130.

It will be appreciated that the coupler block element 52, i.e. plate 96 thereof, reciprocates rectilinearly with respect to the inner surface 132 of plate 130 when the parts are disposed in the position shown in FIG. 1 and as the cam 14 rotates.

Retraction of the piston rod 110 (see FIG. 2) will result in the abutment plate 130 or shoe engaging the tail portion 100 of the plate 96, causing the abutment portion 98 thereof to move out of engagement with the forward edge 104 of the follower block element 50.

The motor means 108 is mounted on a suitable support bracket 134 incorporating a forwardly extending support plate portion 136 terminating in a forward bearing sleeve 138 journaled on an intermediate portion of the shaft means 12. The bearing sleeve 138 includes a rearwardly projecting support portion 140 abuttingly engageable with the forward end of the coupling portion 112 and providing a stop for the same. When the force transmitting rod 110 is fully extended, abutment portion 98 will be engaged in front of the forward edge of the follower block 50 toward edge 104 of the follower block 50.

In order to insure coupling and decoupling of block elements 50 and 52 in timed relationship to rotation of the cams 14 and 14', i.e. only when the roller 60 is disposed in the dwell portion 20 of the cam groove, the shaft 12 has incorporated thereon switch control cams 142 and 142' having a peripheral configuration and corresponding to the cam grooves 20 and 22, these portions being indicated at 20' and 22', respectively, in FIG. 5.

Mounted on opposite sides of the support portion 140 are micro switches 144 and 144' respectively, including a pivoted switch arm 146 and 146', having cam follower elements 148 and 148' respectively, engaged on the outer peripheral surface of the respective control cams 142 and 142'.

Considering FIG. 7 with respect to the previously described structure, it is important that the fluid motor is not retracted when the follower block roller 60 is disposed in the operating cam groove portion 22. Accordingly, and referring to FIG. 7, the fluid motor 108 is operatively connected to a bellows or the like, indicated at 150. Although not shown, the bellows is solenoid operated and is controlled by the electrical circuit indicated generally at 152. A power source 154 is connected to conductors 156 and 158 to the solenoid operated bellows 150. Control switches 160 and 162 are incorporated in the respective conductors 156 and 158 and in series therewith are the cam control switches or levers 146 and 146'.

As previously mentioned, the switch arms 146 and 146' will only activate the micro switches 144 and 144' when the control cams 142 and 142' have the portions 20' engaged with the follower elements 148 or 148'. If the control cams 142 and 142' are not in the properly oriented position, even though the switches 160 and 162 are closed, the circuit to the solenoid control bellows 150 will still be open, and thus the fluid motor 108 cannot be operated to move the abutment plates or shoes 130 to the position for coupling the block elements 50 and 52.

In the event the electrical circuit should fail, mechanical safety abutments are incorporated on the coupler block element 52 and the follower block element 50 (see FIG. 6).

Fixedly secured to the inner surface of the follower block 50 in any suitable manner is an elongated safety bar 164 and mounted on the upper surface of the abutment portion 98 of plate 96 is a stop or abutment element 166. The bar 164 will prevent the abutment portion 98 of the coupler block 52 from moving into the path of travel of the follower block element 50. However, when the parts are disposed in the position shown in FIG. 6, i.e. the follower block element 50 is in abutting relationship to the coupler block element 52, the abutment portion 98 of the follower block is free to move forwardly into the path of movement of the follower block 50, this occurring while the follower block roller 60 is in the dwell portion 20 of the cam groove.

*Brief resume of operation*

Considering FIG. 2, the shaft 12 and cam 14 fixedly mounted thereon will be continuously rotated. The follower block element 50 and the roller 60 thereof is disposed in the cam groove portions 20, 22 and will continuously reciprocate on rods 30 and 32.

When it is desired to move the slide 16 which is connected to rods 30 and 32 through member 38 and rods 44, 46, the fluid motor 108 is actuated to move the coupling element 112 forwardly in the direction indicated by the direction arrow on FIG. 2. This movement causes the force transmitting rod 116 to pivot the abutment shoe or plate 130 toward the rods 30 and 32, causing the coupler plate 96 and the abutment portion 98 to move inwardly toward the path of travel of the follower block 50. The abutment portion 98 will move in overlying relationship with respect to the forward edge 104 of the follower block element 50, and when the roller 60 enters the operating portion 22 due to rotation of the cam 14, the follower block elements 50 and 52 will move in unison toward the rotating shaft 12, causing the slide 16 to reciprocate in the guide rails 18.

When the roller 60 of the follower block 50 is disposed in the dwell portion 20 of the cam groove, the fluid motor 108 may be actuated so that the piston rod 110 can be retracted causing the abument shoe or plate 130 to react on lever portion 100 of plate 96 moving the coupler block element 52 about element 92 to the position shown in FIG. 2.

It will be obvious to those skilled in the art that various changes may be made without departing from the scope of the invention and therefore the invention is not limited to what is shown in the drawings and described in the specification but only as indicated in the appended claims.

What is claimed is:

1. In a cam driven follower assembly comprising:
    shaft means;
    at least one primary cam means having a communicating dwell and operating portion;
    said cam means being operatively connected to said shaft means for simultaneous rotation therewith;
    cam follower means operatively connected to said cam means dwell and operating portions and having a linear path-of-travel;
    bearing means on said shaft means;
    force transmitting means reciprocably supported by said bearing means, the improvement comprising:
    said cam follower means being reciprocably supported on said force transmitting means,
    coupler block means fixed on said force transmitting means for movement therewith;
    said coupler block means including a displaceable latch portion for connection with said cam follower means; and
    motor means operatively connected with said coupler block means latch portion for controlling coupling between said cam follower means and said coupler block, whereby movement of said force transmitting means is controlled.

2. In a cam driven follower assembly as claimed in claim 1 in which said motor means comprises a control circuit operatively connected to said motor means for operating the same, said control circuit including at least one switch operatively connected in said circuit and a control cam on said shaft means and including continuous dwell and operating portions, said dwell and operating portions of said control cam corresponding to the primary cam means, said one switch being operatively connected to said control cam operating and dwell portions whereby said control circuit will only engage said motor means when said cam follower means is in the dwell portion of said primary cam means.

3. In a cam-driven follower assembly as claimed in claim 1 in which said displaceable latch portion of said coupler block mounted on a pivot axis on said coupler block and includes an abutment portion movable into the path of travel of said cam follower means on said force transmitting means.

4. In a cam driven follower assembly as claimed in claim 3 in which said motor means includes an abutment shoe pivotally mounted on an axis of rotation parallel to the pivot axis of said latch portion and abuttingly engaged with said latch portion, said latch portion having free reciprocable movement with said force transmitting means relative to said abutment shoe.

5. In a cam follower assembly as claimed in claim 4 in which said motor means comprises a fluid motor including a force transmitting rod, and a force transmitting link pivotally connected between said abutment shoe and said force transmitting rod.

6. In a cam follower assembly as claimed in claim 3 in which said coupler block abutment portion and said cam follower means respectively include an abutment element and safety bar disposed in an intersecting path of engagement for permitting coupling of said cam follower and said coupler blocks only when said cam follower is in the dwell portion of said primary cam means dwell portion.

7. In a cam follower assembly as claimed in claim 1 in which said communicating dwell and operating portions of said primary cam means comprises a continuous cam groove portion on one side portion of said cam means,
    said bearing means comprising a bock element journaled on said shaft means adjacent the one side portion of said cam means,
    said cam follower means comprising a roller element journaled therein and received in said continuous cam groove portion,
    said bearing means including a bore portion extending normal to said shaft means and offset relative to shaft means, said cam follower comprising a block element having a bore portion in linear alignment with said bearing means bore portion, said force transmitting means being disposed in said bore portions,
    said cam follower block element being disposed between said coupler block element and bearing means block element.

References Cited

UNITED STATES PATENTS 1,998,945   4/1935   Stein _____ 74—55

FRED C. MATTERN, JR., *Primary Examiner.*

W. S. RATLIFF, *Assistant Examiner.*